US009950731B2

(12) United States Patent
Kim et al.

(10) Patent No.: US 9,950,731 B2
(45) Date of Patent: Apr. 24, 2018

(54) STROLLER CUP HOLDER

(71) Applicant: Helen of Troy Limited, Belleville, St. Michael (BB)

(72) Inventors: Sunny Kim, Astoria, NY (US); Tiffany Chen, New York, NY (US)

(73) Assignee: Helen of Troy Limited, Belleville, St. Michael (BB)

( * ) Notice: Subject to any disclaimer, the term of this patent is extended or adjusted under 35 U.S.C. 154(b) by 152 days.

(21) Appl. No.: 14/813,377

(22) Filed: Jul. 30, 2015

(65) Prior Publication Data

US 2017/0029006 A1 Feb. 2, 2017

(51) Int. Cl.
| | | |
|---|---|---|
| *B62B 9/00* | (2006.01) | |
| *B62B 9/26* | (2006.01) | |
| *F16B 2/12* | (2006.01) | |
| *F16B 2/08* | (2006.01) | |
| *F16M 13/02* | (2006.01) | |
| *F16B 1/00* | (2006.01) | |
| *F16M 11/04* | (2006.01) | |
| *F16M 11/10* | (2006.01) | |

(52) U.S. Cl.
CPC ............... *B62B 9/26* (2013.01); *F16B 2/08* (2013.01); *F16B 2/12* (2013.01); *B62B 2202/023* (2013.01); *F16B 2001/0028* (2013.01); *F16M 11/041* (2013.01); *F16M 11/10* (2013.01); *F16M 13/022* (2013.01); *F16M 2200/024* (2013.01)

(58) Field of Classification Search
CPC ........... B62B 2202/023; Y10S 224/926; A45F 2005/026
USPC ....... 224/409, 425, 426, 441, 420, 572, 408, 224/447, 448; 248/311.2
See application file for complete search history.

(56) References Cited

U.S. PATENT DOCUMENTS

| | | | | |
|---|---|---|---|---|
| 3,096,960 A | * | 7/1963 | Kinney ................. | A47L 13/512 248/113 |
| 3,285,456 A | * | 11/1966 | Pewitt ................ | A47G 23/0241 215/12.1 |
| 3,734,439 A | * | 5/1973 | Wintz ................ | A47G 23/0241 131/241 |
| 3,941,237 A | * | 3/1976 | MacGregor, Jr. ......... | B08B 9/28 198/690.1 |
| 4,535,923 A | * | 8/1985 | Manke ................... | B60N 3/103 224/272 |
| 4,747,507 A | * | 5/1988 | Fitzgerald .............. | A47G 23/02 220/739 |

(Continued)

FOREIGN PATENT DOCUMENTS

NL 2011208 7/2014

OTHER PUBLICATIONS

International Search Report filed in PCT/US2016/037732 dated Oct. 28, 2016.

*Primary Examiner* — Justin Larson
(74) *Attorney, Agent, or Firm* — Rankin, Hill & Clark LLP (57) ABSTRACT

A cup holder for an associated stroller includes a cup for releasably holding therein an associated drink container and a base detachably connected to the cup. The base includes a mounting member releasably connecting the cup holder to an associated stroller bar and a tightening mechanism separately engaging the associated stroller bar for tightening the base against the associated stroller bar and holding the cup holder at a predetermined location on the associated stroller bar.

12 Claims, 8 Drawing Sheets

(56) References Cited

U.S. PATENT DOCUMENTS

| | | | | |
|---|---|---|---|---|
| 4,798,318 A * | 1/1989 | Irwin | B62J 7/06 224/417 |
| 4,856,744 A | 8/1989 | Frankel | |
| 4,870,837 A | 10/1989 | Weins | |
| 5,007,612 A * | 4/1991 | Manfre | A01K 97/00 220/DIG. 9 |
| 5,014,892 A * | 5/1991 | Copeland | A45F 5/02 224/242 |
| 5,014,956 A * | 5/1991 | Kayali | B60N 3/102 248/311.2 |
| 5,071,096 A * | 12/1991 | Hartman | A47G 23/0216 248/154 |
| 5,190,257 A * | 3/1993 | Gradei | E06C 7/14 248/231.71 |
| 5,395,018 A * | 3/1995 | Studdiford | B62H 5/00 224/420 |
| 5,419,154 A * | 5/1995 | Christoff | A45F 3/16 220/709 |
| 5,464,183 A | 11/1995 | McConnell et al. | |
| 5,522,527 A * | 6/1996 | Tsai | B62J 29/00 224/414 |
| 5,626,320 A * | 5/1997 | Burrell | B64D 43/00 248/227.4 |
| 5,853,158 A * | 12/1998 | Riggle | A47G 23/0225 248/103 |
| 5,857,601 A | 1/1999 | Greenwood | |
| 5,996,184 A * | 12/1999 | Mah | G08B 3/1058 24/3.11 |
| 5,996,957 A * | 12/1999 | Kurtz | A47G 23/0225 248/231.21 |
| 6,059,138 A * | 5/2000 | Labruyere | A47G 23/0225 220/23.4 |
| 6,283,348 B1 * | 9/2001 | Wang | A45F 5/02 224/197 |
| 6,390,427 B1 * | 5/2002 | McConnell | B60N 3/103 248/228.3 |
| 6,493,982 B1 * | 12/2002 | Macaluso | A01K 87/08 43/21.2 |
| 6,601,813 B1 * | 8/2003 | Kager | A45D 20/12 248/288.31 |
| 6,644,524 B1 | 11/2003 | Garvin | |
| 6,705,580 B1 * | 3/2004 | Bain | B60N 3/106 248/311.2 |
| 6,942,131 B2 | 9/2005 | Trautman | B62J 11/00 224/414 |
| 6,955,279 B1 | 10/2005 | Mudd | A45F 5/02 224/197 |
| 6,957,795 B1 * | 10/2005 | Hsieh | F16B 2/12 248/231.51 |
| 6,983,918 B1 * | 1/2006 | Leasure | A63B 27/00 248/274.1 |
| D516,872 S * | 3/2006 | Rigberg | D7/619.1 |
| 7,040,590 B2 * | 5/2006 | Carnevali | B60N 3/103 248/309.1 |
| 7,090,183 B2 | 8/2006 | Heybl et al. | |
| 7,093,742 B2 * | 8/2006 | Steven | A45F 5/02 224/197 |
| 7,162,281 B2 * | 1/2007 | Kim | A45F 5/02 224/196 |
| 7,322,500 B2 * | 1/2008 | Maierholzner | B60N 3/102 15/236.02 |
| 7,409,237 B2 * | 8/2008 | Tages | A45F 5/02 24/3.11 |
| 7,614,640 B2 | 11/2009 | Dean et al. | |
| 8,087,528 B1 * | 1/2012 | Scarlett | A47G 23/0216 220/23.89 |
| 8,215,601 B2 * | 7/2012 | Downs | A47G 23/0225 224/414 |
| 8,353,495 B2 * | 1/2013 | Ogura | B60N 3/106 224/548 |
| 8,500,076 B2 * | 8/2013 | Lai | A47G 23/0225 224/148.5 |
| 8,579,149 B2 * | 11/2013 | Henke | B60N 3/10 220/634 |
| 8,851,348 B2 * | 10/2014 | Zuraski | B62H 5/00 224/425 |
| 8,894,030 B2 * | 11/2014 | Nixon | A47G 23/0225 220/737 |
| 8,919,622 B1 * | 12/2014 | Gabriel | A45F 5/02 224/148.4 |
| 9,133,006 B2 * | 9/2015 | Kelley | B67C 7/00 |
| D755,575 S * | 5/2016 | Pratt | D7/620 |
| 9,345,353 B2 * | 5/2016 | Forbes | G09F 21/04 |
| 9,399,479 B1 * | 7/2016 | Chen | B62B 9/00 |
| D771,525 S * | 11/2016 | Kim | D12/133 |
| 2002/0148868 A1 | 10/2002 | Dion-Bildstein et al. | |
| 2005/0199667 A1 | 9/2005 | Cappellino et al. | |
| 2006/0169860 A1 * | 8/2006 | Altheimer | A47G 23/0216 248/311.2 |
| 2008/0011925 A1 * | 1/2008 | Ruff | B60N 3/103 248/310 |
| 2008/0190948 A1 * | 8/2008 | Sayasithsena | B65D 25/24 220/737 |
| 2012/0104010 A1 * | 5/2012 | Kelley | B67C 7/00 220/737 |
| 2013/0015219 A1 * | 1/2013 | Zuraski | B62J 11/00 224/443 |
| 2014/0284443 A1 * | 9/2014 | Forbes | G09F 21/04 248/313 |

* cited by examiner

STROLLER CUP HOLDER

BACKGROUND

A conventional stroller typically has a partitioned pouch at the back side of the lounge seat and/or a holding net formed in a tray shape below the lounge seat to hold and store various items, such as diapers, food items and the like. However, bottles or cups stored in such locations are not easily accessible.

To address this problem, it is known to attach a drink or cup holder to a handlebar of the stroller. The cup holder typically includes a cup and an attachment clip which is connectable with the handlebar. The container, which can be detachable from the attachment clip, is typically adapted to secure the bottle or cup within the container. A drawback of the known cup holders is the manner by which the holder is attached to the stroller, which allows the cup holder to move on the handlebar causing the beverage held therein to tip and possibly spill within the stroller.

BRIEF DESCRIPTION

In view of the foregoing, a cup holder for attaching to an associated stroller includes a cup and a connector. The cup is configured to hold an associated drink container. The cup includes a sidewall defining an inner surface and a plurality of flaps extending inwardly from the sidewall. The inner surface is centered around a central axis. Each flap is aligned in a plane that is parallel with the central axis or nearer to parallel with the central axis as compared to perpendicular with the central axis. The connector is on the sidewall of the cup to facilitate connecting the cup with the associated stroller.

A cup holder for an associated stroller includes a cup for releasably holding therein an associated drink container and a base detachably connected to the cup. The base includes a mounting member releasably connecting the cup holder to an associated stroller bar and a tightening mechanism separately engaging the associated stroller bar for tightening the base against the associated stroller bar and holding the cup holder at a predetermined location on the associated stroller bar.

In accordance with another aspect, a cup holder for an associated stroller comprises a cup for releasably holding therein an associated drink container and a base detachably connected to the cup. A release mechanism includes a push button operably provided on the base and a toothed support member attached to an outer surface of a sidewall of the cup. The push button engages the support member to releasably secure the base to the cup. The support member cooperates with an inner surface of the base to prevent the cup from swinging freely and allow for angular adjustment of the cup with respect to the base.

DETAILED DESCRIPTION

It should, of course, be understood that the description and drawings herein are merely illustrative and that various modifications and changes can be made in the structures disclosed without departing from the present disclosure. In general, the figures of the exemplary stroller cup holder are not to scale. It will also be appreciated that the various identified components of the exemplary stroller cup holder disclosed herein are merely terms of art that may vary from one manufacturer to another and should not be deemed to limit the present disclosure.

Referring now to the drawings, wherein like numerals refer to like parts throughout the several views, FIGS. 1-7 illustrate an exemplary cup holder 100 according to the present disclosure for use with an infant or child carriage, stroller or the like. The cup holder 100 includes a cup 102 for releasably holding therein an associated drink container and a base 104 detachably connected to the cup 102. As depicted, the cup 102 includes a sidewall 110, a bottom 112 and an open top 114. The sidewall 110 is provided with longitudinal slots 120 which are diametrically opposed to accommodate a drink container with handles, such as a child's sippy cup. Each of the longitudinal slots 120 can extend along a majority of a length of the cup 102 and can include a curved end portion 122 to better secure therein the handles. Further, an outer edge 124 of the cup 102 can be provided with a rounded lip 126 for feel and comfort of handling of the cup holder 100.

The cup 102 includes a plurality (e.g., two or more) inwardly projecting, resilient flaps 130. The flaps 130 allow the cup 102 to accommodate associated drink containers having differing dimensions or sizes (e.g., drink containers having differing diameters). As shown, four flaps 130 circumferentially spaced on the sidewall 110; two flaps 130 being located on each portion of the sidewall 110 defined between the slots 120. Although, it should be appreciated that more or less than the depicted number of flaps 130 can be provided on the cup 102. Each of the flaps 130 can be slightly canted. The cup 102 includes the sidewall 110 defining an internal surface 132. The plurality of flaps 130 each extend inwardly from the internal surface 132, and the internal surface is centered around a central axis 134. The flaps 130 are each aligned in a plane that is nearer to parallel with the central axis 134 as compared to perpendicular with the central axis. Alternatively, the flaps 130 can each be aligned in a plane that is parallel with the central axis 134. The flaps 130 are configured to rotate when an associated drink container contacts the each flap when being inserted into the cup 102. For example, with reference to FIG. 2, one flap 130a, which is located on one side of a plane intersecting the central axis 134 (not shown in FIG. 2) and bisecting the cup 102, is configured to rotate in a first rotational direction (e.g., clockwise when viewed from above) when the associated drink container contacts the flap 130a when being inserted into the cup. Another flap 130b, which is located on an opposite side of the plane intersecting the central axis 134 and bisecting the cup 102, is configured also to rotate in the first rotational direction when the associated drink container contacts the flap 130b when being inserted into the cup 102. Other flaps 130c, 130d, which are located on either side of the plane intersecting the central axis and bisecting the cup 102, are each configured to rotate in a section rotational direction (e.g., counterclockwise when viewed from above) when the associated drink container contacts the flaps 130c, 130d when being inserted into the cup 102.

Figure 6:
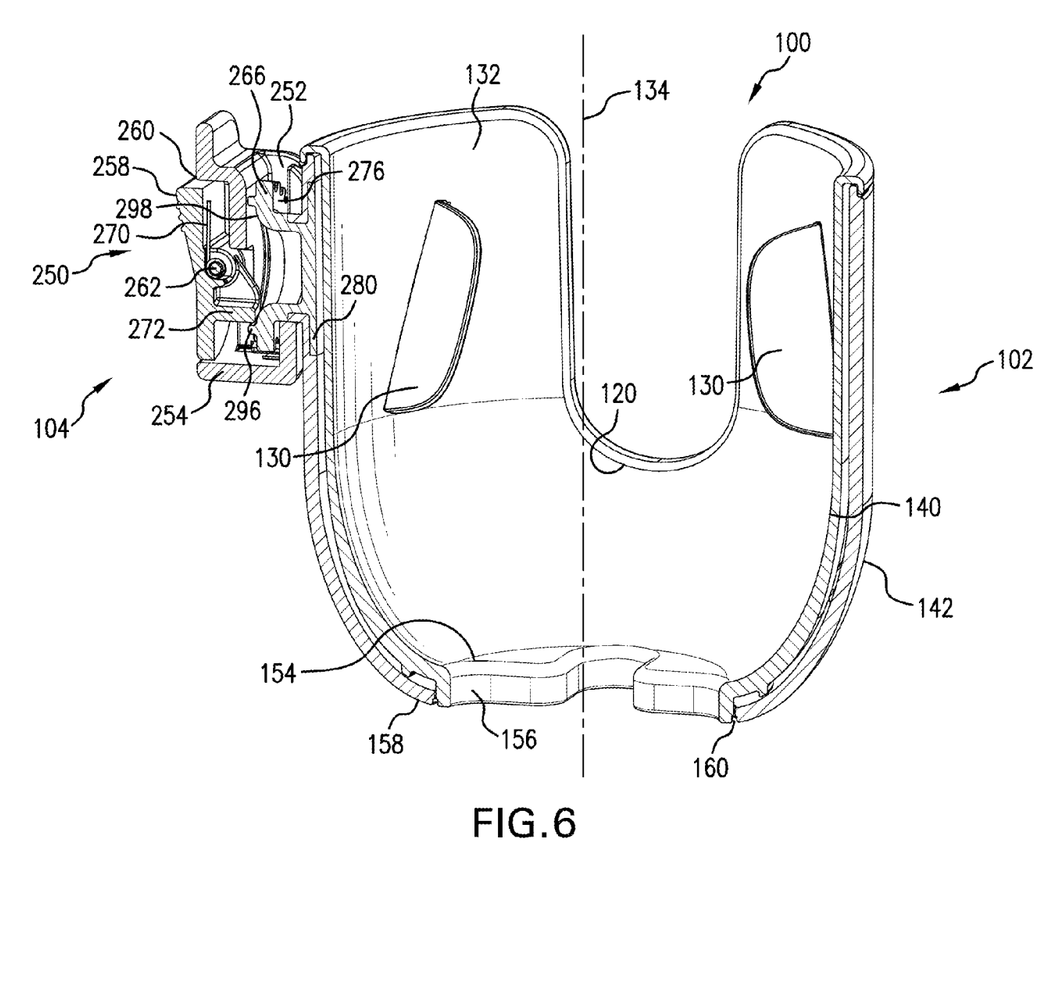
FIG. 6 is a side cross-sectional view of the cup holder of FIG. 2.

As more clearly seen in FIG. 6, the internal surface 132 is curved and converges toward the central axis 134 below the plurality of flaps 130. Also, the internal surface 132 is cylindrical between a lower end (end closer to the bottom 112) of each flap 130 and the open top 114. In the illustrated embodiment, two flaps 130 extend inwardly from the internal surface on one side of a plane intersecting the central axis 134 and each longitudinal slot 120 and another two flaps 130 extend inwardly from the internal surface on an opposite side of the plane intersecting the central axis 134 and each longitudinal slot 120. Also in the illustrated embodiment, the longitudinal slots 120 include a first slot spaced 180 degrees from a second slot around the central axis 134. In the illustrated embodiment, the longitudinal slots 120 are intersected by a plane intersecting the central axis 134 and bisecting the cup 102.

Figure 3:
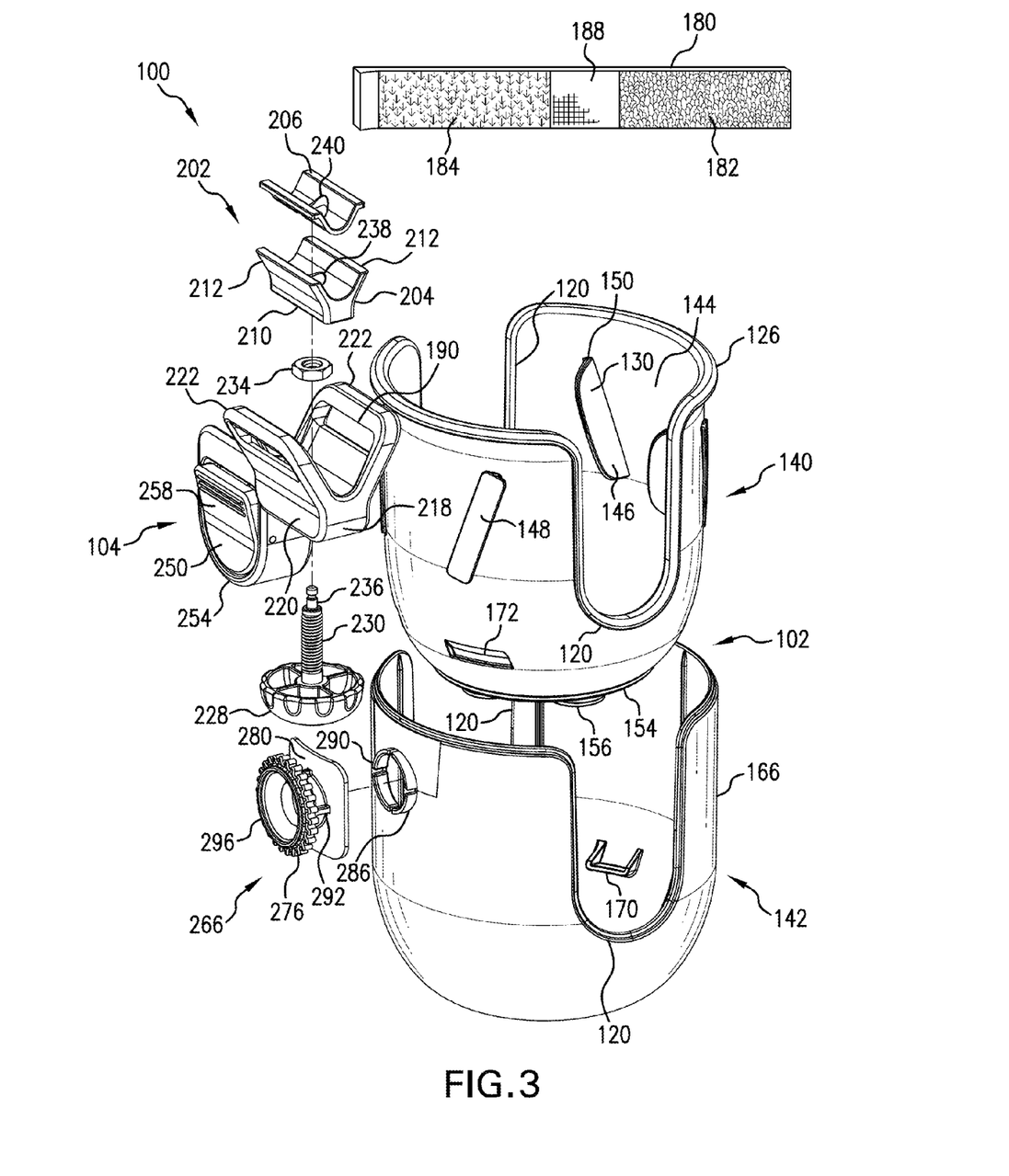
FIG. 3 is an exploded perspective view of the cup holder of FIG. 1.

As best illustrated in FIG. 3, in the depicted embodiment of the cup holder 100, the cup 102 can be defined by an inner cup 140 received in an outer cup 142. The connection between the inner cup 140 and the outer cup 142 can be a releasable or a more permanent connection. The flaps 130 are located on a sidewall 144 of the inner cup 140. According to one aspect, each of the flaps 130 includes a projecting portion 146 and a base portion 148. The projecting portion 146 is relatively very much thinner in a direction substantially parallel with the periphery (circumference) of the cup 102 as compared to a direction substantially parallel with the central axis 134 and a direction in which the projecting portion 146 extends inwardly from the internal surface 132. To accommodate the flaps 130, elongated slots or openings 150 dimensioned to receive the projecting portions 146 of the flaps 130 are located on the sidewall 144. Once properly positioned in the openings 150, the base portions 148 of the flaps 130 abut against the sidewall 144 of the inner cup 140, and the flaps 130 are retained in the openings 150 by the outer cup 142, which together with the inner cup 140, sandwiches the flap base portions 148. With this arrangement of the cup holder 100, the flaps 130 can be removed from the cup 102 for cleaning. However, it should be appreciated that that flaps base portions 148 can be adhered to the sidewall 144 of the inner cup 140 thereby defining an integral, one-piece assembly.

Figure 5:
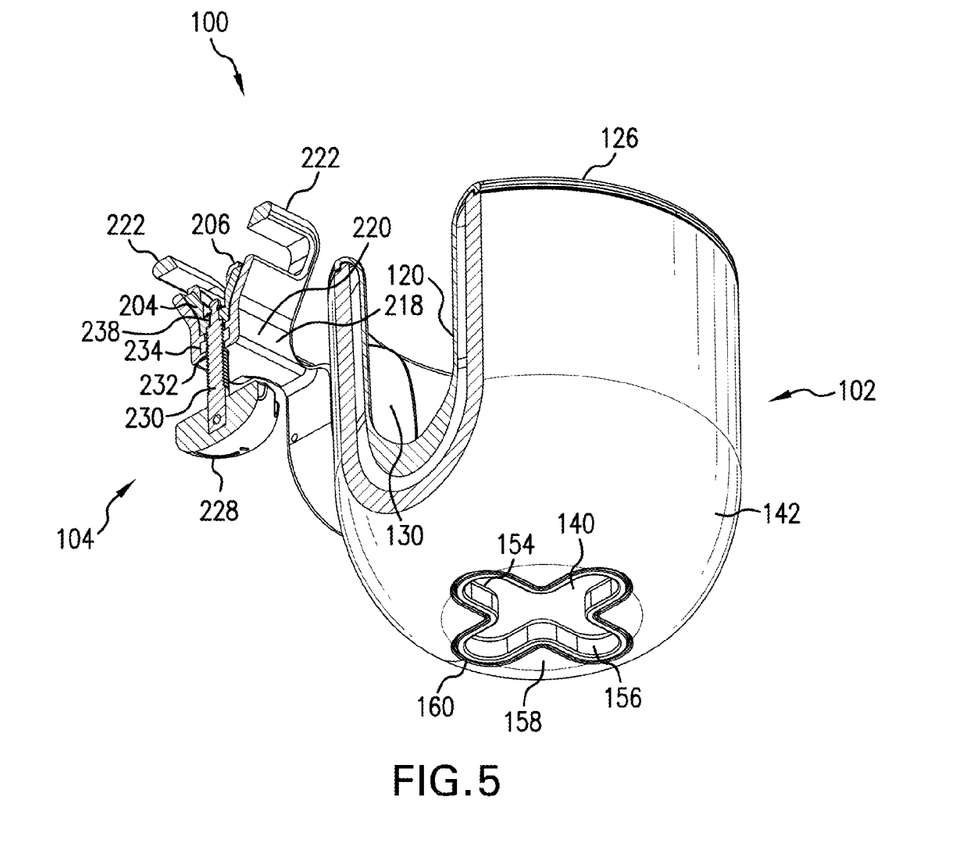
FIG. 5 is a side perspective view in partial cross-section of the cup holder of FIG. 2.

To secure the inner cup 140 within the outer cup 142, a bottom surface 154 of the inner cup 140 can have an outwardly extending projection 156 and a bottom surface 158 of the outer cup 142 can include a corresponding opening 160 to receive the projection 156. As best depicted in FIGS. 5 and 6, and according to one embodiment, each of the projection 156 and opening 160 is plus-shaped, which provides for a fixed position of the inner cup 140 within the outer cup 142. In other words, with the shape of the projection 156 and corresponding opening 160, the inner cup 140 can be prevented from rotating within the outer cup 142. It should be appreciated that alternative shapes (e.g., polygonal shapes) of the projection 156 and opening 160 to prevent this rotation are contemplated. It should also be appreciated that the slots 120 for handles of a drink container can prevent rotation of the inner cup 140 within the outer cup 142. Further, as shown in FIG. 3, a sidewall 166 of the outer cup 142 can include at least one inwardly extending tab 170, and the sidewall 144 of the inner cup 140 can include at least one aperture 172 sized to releasable receive the at least one tab 170. In the illustrated embodiment, a pair of diametrically spaced tabs 170 and a pair of corresponding apertures 172 are provided on the cup 102. The tabs 170 are positioned in the apertures 172 when the inner cup 140 is secured in and to the outer cup 142. According to one aspect, with the tabs 170 positioned in the apertures 172 the inner cup 140 is fixed within (i.e., not removable from) the outer cup 142.

Figure 1:
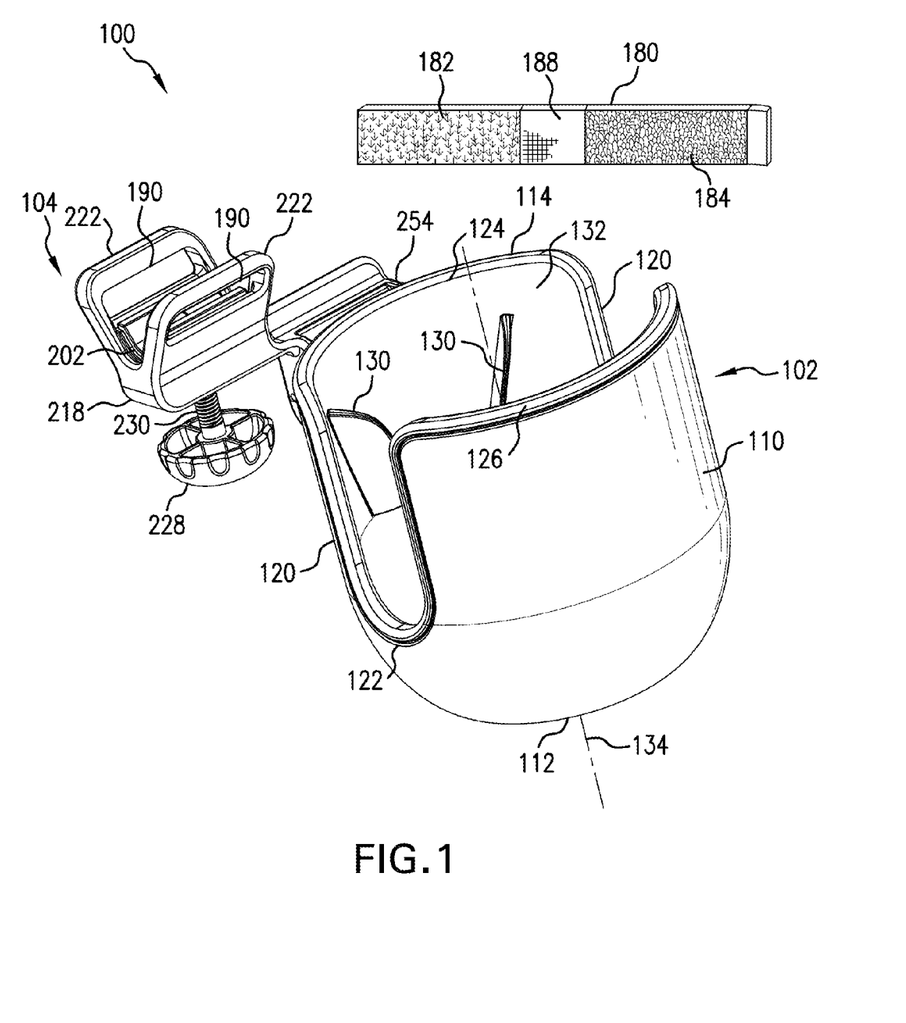
FIG. 1 is a side perspective view of an exemplary cup holder according to the present disclosure.
Figure 2:
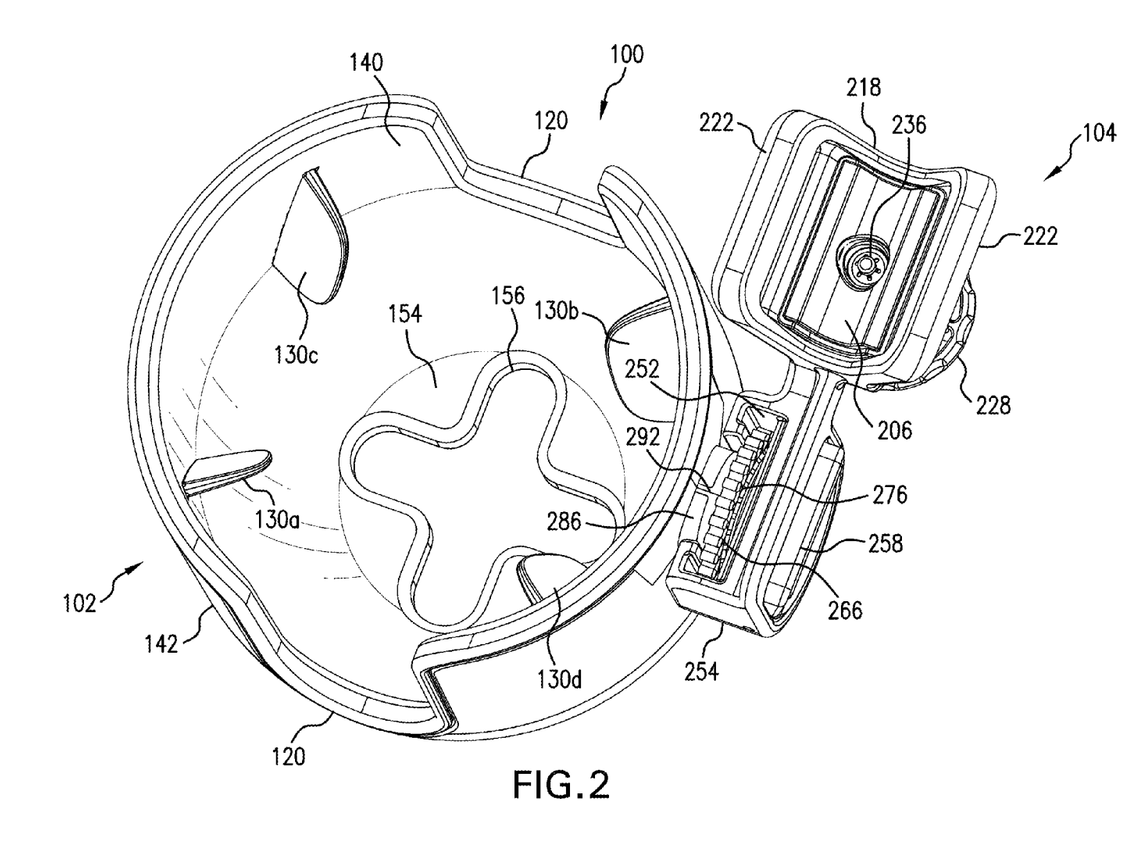
FIG. 2 is a top perspective view of the exemplary cup holder sans a mounting member of the cup holder of FIG. 1.

With reference to FIGS. 1 and 3, the base 104 of the exemplary cup holder 100 includes a mounting member 180 adapted to releasably connect the cup holder 100 to a stroller bar. Although snaps, hooks, clips, latches and the like may be used as the mounting member, in the illustrated embodiment the mounting member 180 is an elongated strap for wrapping around the stroller bar, which can be a hook-and-loop type or hook-and-pile type fastener (referred to under the tradename Velcro™). By way of example, the strap 180 can be formed of a two-part hook 182 and loop 184 fabric material. This allows the cup holder 100 to be easily attached and removed from the stroller bar by merely separating the end portions of the strap 180. Further, the strap 180 is adjustable to fasten around any number of different sized stroller bars. The illustrated strap 180 also has a section 188 formed of a material having a high coefficient of friction for gripping the stroller bar. By way of example, the section 188 can be formed of a silicone material. To accommodate the strap 180, the base 104 includes at least one slot 190 that receives the strap. As shown, a pair of slots 190 is provided on the base 104 for receiving the strap 180.

Figure 4:
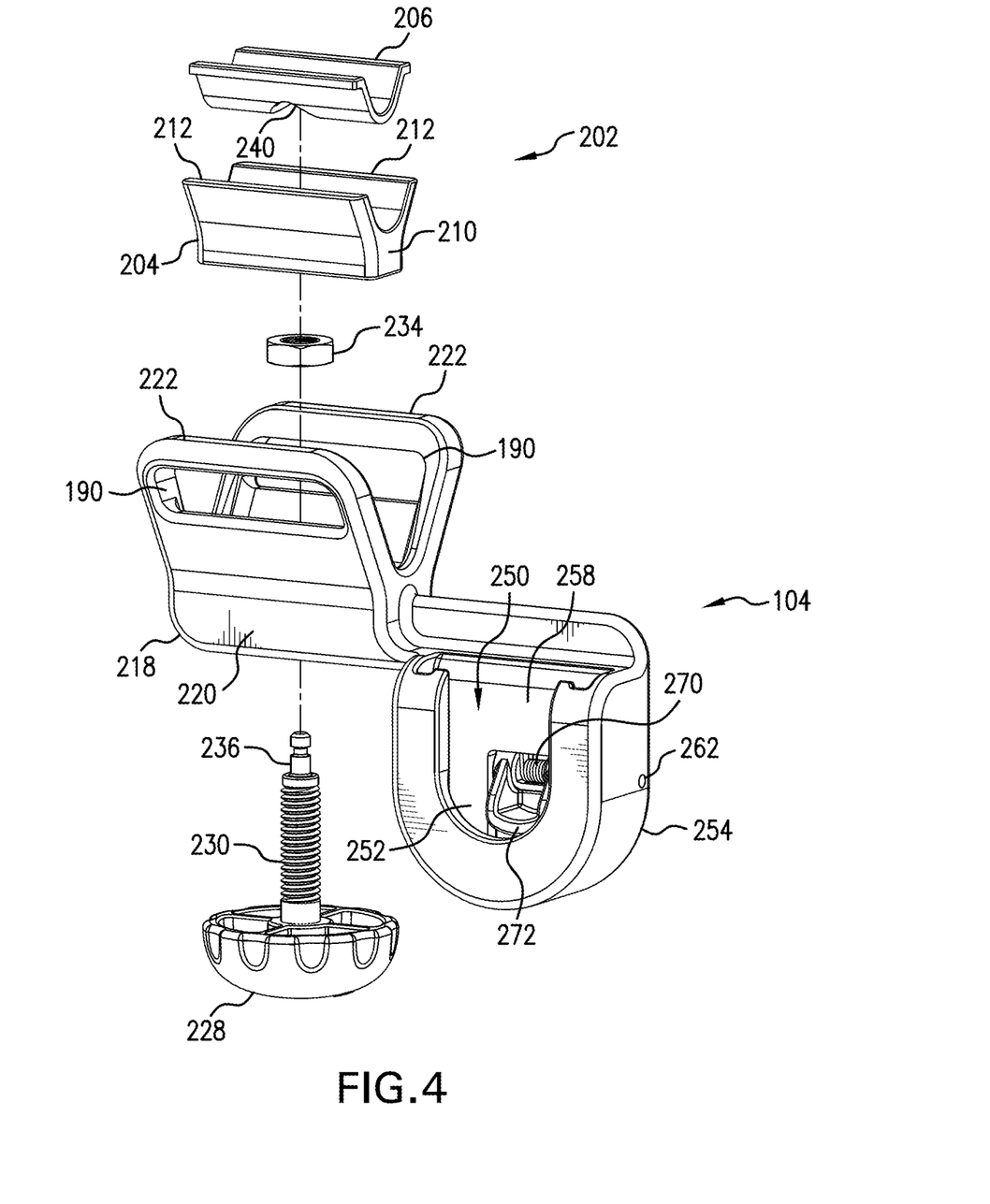
FIG. 4 is an enlarged view of a base of the cup holder of FIG. 3.

The base 104 further comprises a tightening mechanism 200 configured to separately engage the stroller bar for tightening the base 104 against the stroller bar and holding the cup holder 100 at a predetermined location on the stroller bar. With reference to FIGS. 3-5, the tightening mechanism 200 includes a clamp 202 movable in a translational manner relative to the cup 102 and base 104 into engagement with the stroller bar. The exemplary clamp 202 is defined by a first clamp part 204 or pusher and a second clamp part 206 or pusher grip. The first clamp part 204 includes a body 210 having a pair of arms 212 extending outwardly from the body 210 and away from each other. The second clamp part 206 is generally U-shaped and is sized to fit within a space defined by the body 210 and arms 212 of the first clamp part 204. Although, it should be appreciated that a one-piece clamp can be used for the tightening mechanism 200. The clamp 202 is positioned in a first base part 218 of the base 202 that is defined by a support body 220 and a pair of tabs 222 flared outwardly from the support body 220. As shown, the slots 190 for the strap 180 are formed in the tabs 222. The exemplary tightening mechanism 200 further includes a knob 228 and a threaded rod or screw 230 connected to the clamp 202. As best depicted in FIG. 5, the threaded rod 230 is received in an opening 232 located in the support body 220 of the first base part 218 and is threadingly engaged to a nut 234 housed in the support body 220 of the first base part 218. The nut 234 secures the threaded rod 230 to the base 104. An end portion 236 of the threaded rod 230 extends through a hole 238 in the body 210 of the first clamp part 204 and projects through a corresponding hole 240 in the second clamp part 206. Rotational movement of the threaded rod 230 via the knob 228 results in the translational movement of the clamp 202. And because in the depicted embodiment the clamp 202 is positioned opposite (i.e., beneath in the figures) the mounting member or strap 180, the clamp 202 can press the mounting member 180 into engagement with the stroller bar thereby further securing the base 104 to the stroller bar and enhancing vibration resistance and stability of the cup holder 100.

Figure 7:
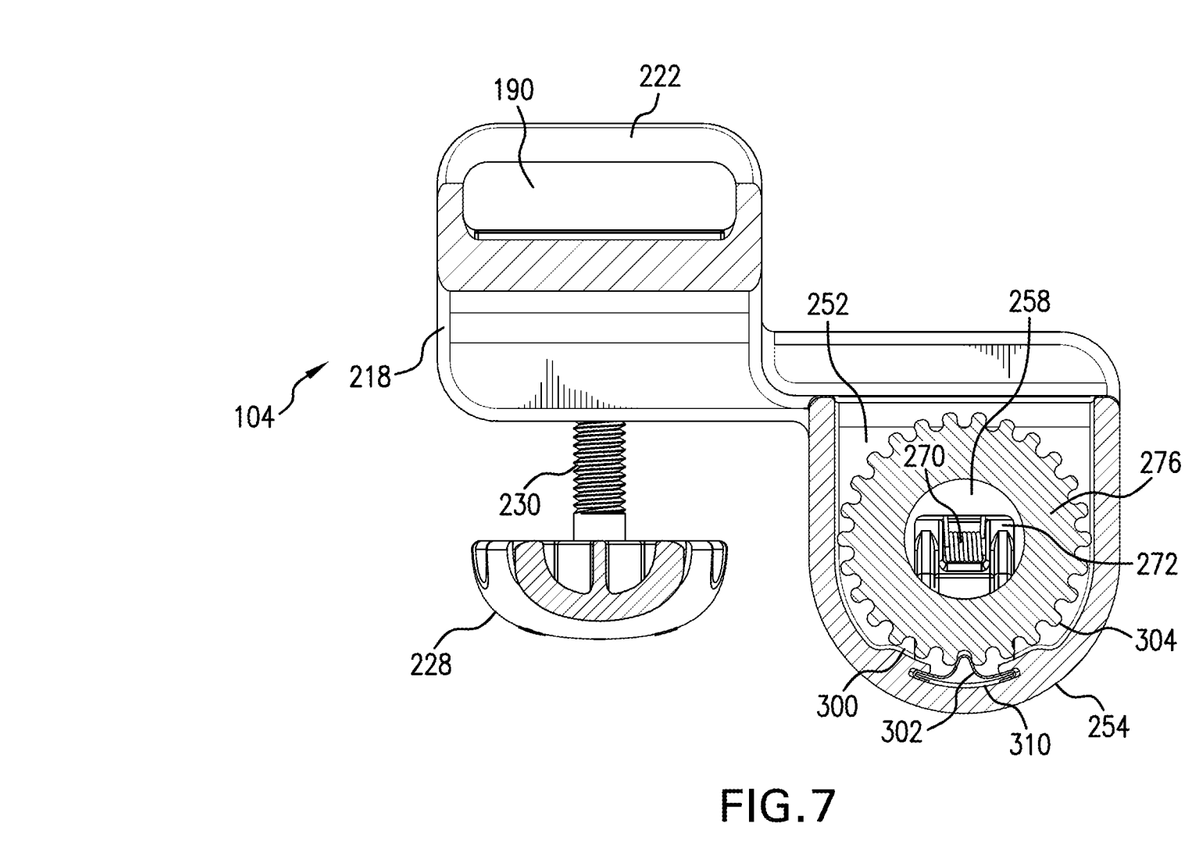
FIG. 7 is an enlarged side cross-sectional view of the base of the cup holder of FIG. 2.

The exemplary cup holder 100 further includes a release mechanism 250 housed in a cavity 252 defined in a second base part 254 of the base 104. The release mechanism 250 is operable to detach the base 104 from the cup 102 and also angularly adjust the cup 102 with respect to the base 104. The release mechanism 250 includes a push button 258 provided on the base 104. The push button 258 is at least partially housed in an opening 260 located in the second base part 254 opposite the cavity 252, and is pivotally secured to the second base part 254 via a pin 262. The push button 258 is in selective engagement with a connector 266 located on the cup 102 for securing the base 104 to the cup 102. As best shown in FIGS. 6 and 7, a biasing member or spring 270 mounted to the pin 262 urges a catch 272, which as illustrated is a protuberance extending toward the cup 102, of the push button 258 toward and into engagement with the connector 266. The catch 272 can be a U-shaped projection with the spring 270 being as least partially received in the projection. According to one aspect, the connector 266 is a toothed support member or toothed wheel 276 attached to the sidewall 110 of the cup 102 and at least partially received in the cavity 252 of the base 104. The toothed wheel 276 is attached to a base member 280 having an opening 282 sized to receive an annular flange 286 located on the sidewall 110 of the cup 102. The flange 286 can be provided with at least one cutout 290 for receiving at least one corresponding tab 292 provided on the base member 280. In the depicted embodiment, the flange 286 includes four spaced cutouts 290 and the base member 280 includes four corresponding tabs 292; although, this is not required. The base member 280 mates to the flange 286, with the flange 286 being received in the opening 282 and the tabs 292 being received in the cutouts 290. However, it should be appreciated that the connector 266 can be integral with the sidewall 110 of the cup 102.

The catch 272 of the push button 258 engages the toothed wheel 276, and more particularly, a lip 296 of the toothed wheel. The lip 296 in the illustrated embodiment is annular and projects from a face 298 of the toothed wheel 276 in an axial direction with respect to the toothed wheel 276 outwardly from the face 298 and the cup 102. The catch 272 and the lip 296 are configured such that when the catch 272 engages or contacts the lip 296, movement of the toothed wheel 276, and thus the cup 102 connected with the toothed wheel 276, is precluded in an upward direction (per the orientation of FIG. 6) with respect to the base 104. As such, the toothed wheel 276 is retained in the cavity 252 of the base 104 when the catch 272 contacts the lip 296. To disconnect the cup 102 from the base 104, an operator presses inwardly on the push button 258 above the pin 262, which overcomes the biasing force of the spring 270. The catch 272 then moves away from contact with the lip 296, and the cup 102 can be lifted upwardly (per the orientation shown in FIG. 6) with respect to the base. It should be appreciated that in lieu of the lip 296, the catch 272 of the push button 258 can engage teeth of the toothed wheel 276.

With reference to FIG. 7, the toothed wheel 276 cooperates with an inner surface 300 of the second base part 254 of the base 104 to prevent the cup 102 from swinging freely and to allow for rotation of the cup 102 about an central axis of the toothed wheel 276 to adjust a mounting angle of the cup 102 with respect to the base 104. In the depicted embodiment, a projection 302 is provided on the inner surface 300. The projection 302 is dimensioned to be selectively positioned and received between adjacent teeth 304 of the toothed wheel 276, and engagement of the projection 302 with the toothed wheel 276 allowing for angular adjustment of the cup 102 with respect to the base 104. The projection 302 can be resilient so as to move with respect to the base 104. In the illustrated embodiment, the projection 302 can be a spring catch that is at least partially received in a cutout 310 located on the inner surface 300. The use of the spring catch as the projection 302 allows for rotation of the cup 102 while also providing the user a tactile and/or audible feedback (i.e., a clicking sound) as the spring catch is rides over the teeth 304 of the toothed wheel 276. Further, the engagement between the projection 302 and the toothed wheel 276 is such that the cup 102 can be held at various angular positions relative to the base 104 mounted on a stroller bar. By providing a spring catch, the angular position of the cup 102 relative to the base 104 can be maintained even when a drink container is received in the cup 102; however, if the cup 102 is knocked while mounted to the stroller the cup 102 is able to move with respect to the base 104.

As is evident from the foregoing, the present disclosure provides an exemplary cup holder 100 including the base 104 that connects with a stroller bar and the cup 102 detachably coupled with the base. The base 104 includes strap slots 190 that receive a strap 180 with double-stick-on Velcro™ fasteners sewn to the strap. The strap 180 wraps around the stroller bar to provide a connection between the base 104 and the stroller bar. The base 104 includes a secondary tightening mechanism 200 having a knob 228, a threaded rod 230 and a clamp 202. Rotational movement of the knob 228 and threaded rod 230 results in translational movement of the clamp 202. The knob 228 can be turned in a tightening direction to move the clamp 202 toward the stroller bar to further tighten the base 104 to the stroller bar. A push button 258 on the base 104 can be pressed to release the cup 102 from the base. A toothed wheel 276 attaches to the cup 102 and is received in the cavity 252 of the base 104. The toothed wheel 276 cooperates with the inner surface 300 of the cavity to keep the cup 102 from swinging freely and allows for rotation of the cup 102 about a horizontal axis to adjust the mounting angle of the cup with respect to the base 104. The toothed wheel 276 and inner surface 300 of the cavity do not lock the angular position of the cup 102; the cup will rotate about the horizontal axis if, for example, bumped. The cup 102 includes longitudinal slots 120 to accommodate drinking cups with handles, e.g., sippy cups. Flaps 130 extend inwardly from the cup 102 to accommodate beverage containers having different dimensions.

Figure 8:
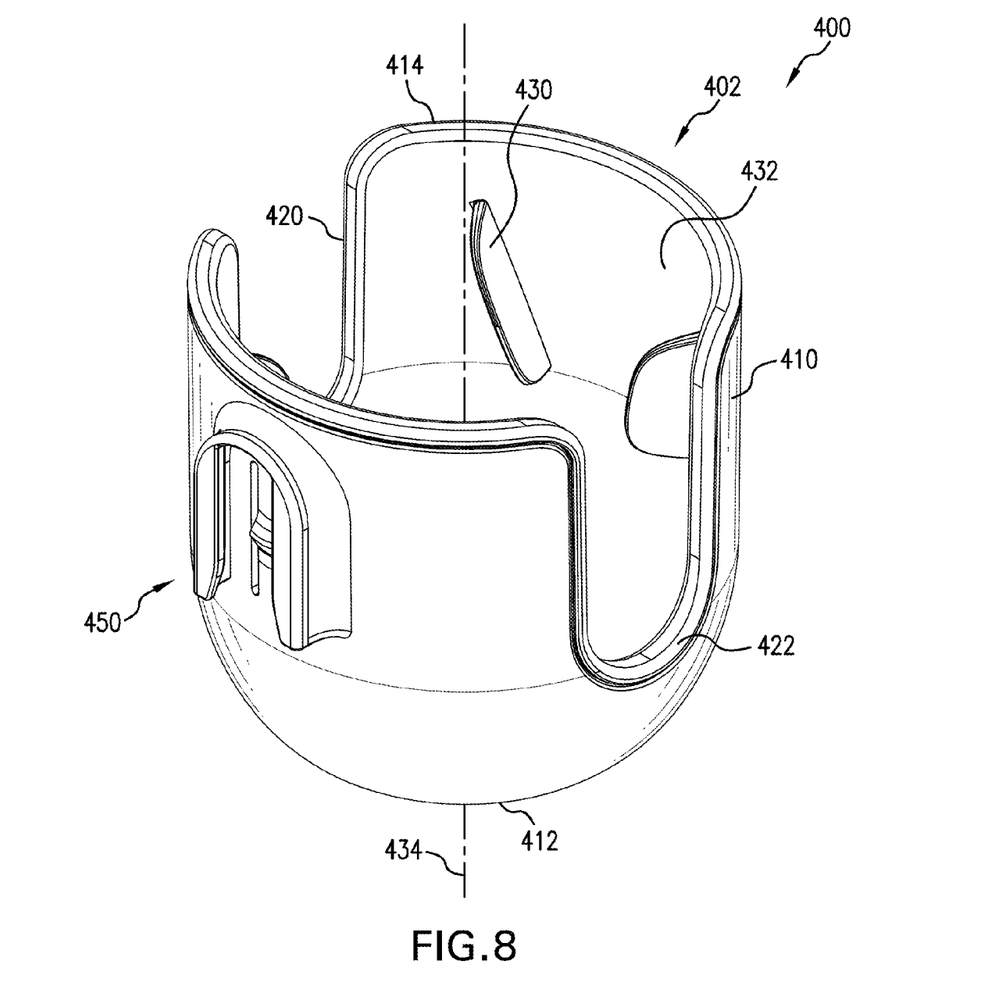
FIG. 8 is a perspective view of a cup holder having a connector differing from a connector of the cup holder shown in FIGS. 1-7.

FIG. 8 depicts another example of a cup holder 400 that is similar in many respects to the cup holder 100 described above. The cup holder 400 includes a cup 402 configured to hold an associated drink container. As depicted, the cup 402 includes a sidewall 410, a bottom 412 and an open top 414. The sidewall 410 is provided with longitudinal slots 420 which are diametrically opposed to accommodate a drink container with handles, such as a child's sippy cup. Each of the longitudinal slots 420 can extend along a majority of a length of the cup 402 and can include a curved end portion 422.

The cup 402 includes inwardly projecting, resilient flaps 430. The flaps 430 allow the cup 402 to accommodate associated drink containers having differing dimensions or sizes (e.g., drink containers having differing diameters). As shown, four flaps 430 circumferentially spaced on the sidewall 410; two flaps 430 being located on each portion of the sidewall 410 defined between the slots 420. Each of the flaps 430 can be slightly canted. The cup 402 includes the sidewall 410 defining an internal surface 432. The plurality of flaps 430 each extend inwardly from the internal surface 432, and the internal surface is centered around a central axis 434. The flaps 430 are each aligned in a plane that is nearer to parallel with the central axis 434 as compared to perpendicular with the central axis. The internal surface 432 of the cup 402 can be similar in configuration to the internal surface 132 of the cup 102 shown in FIG. 6, i.e., the internal surface 432 can be curved and converge toward the central axis 434 below the plurality of flaps 430. Also, the internal surface 432 can be cylindrical between a lower end (end closer to the bottom 412) of each flap 430 and the open top 414. Two flaps 430 can extend inwardly from the internal surface 432 on one side of a plane intersecting the central axis 434 and each longitudinal slot 420 and another two flaps 430 can extend inwardly from the internal surface on an opposite side of the plane intersecting the central axis 434 and each longitudinal slot 420. Also in the illustrated embodiment, the longitudinal slots 420 include a first slot spaced 180 degrees from a second slot around the central axis 434.

The cup 402 can also include a connector 450 on the sidewall 410 of the cup to facilitate connecting the cup 402 with an associated stroller. The connector 450 can operate to receive an extension (not shown) on a stroller bar (not shown) to connect the cup holder 400 with the stroller.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A cup holder for an associated stroller comprising:
   a cup for releasably holding therein an associated drink container;
   a base connected to the cup, the base including a mounting member releasably connecting the cup holder to an associated stroller bar and a tightening mechanism separate from the mounting member, the tightening mechanism separately engaging the associated stroller bar and also pressing a separate mounting member into engagement with the associated stroller bar for tightening the base against the associated stroller bar and holding the cup holder at a predetermined location on the associated stroller bar; and
   a release mechanism housed in a cavity defined in the base, the release mechanism including a push button provided on the base and in selective engagement with a connector located on the cup for releasably securing the base to the cup, wherein the connector is a toothed wheel fixed on an outer surface of a cup sidewall, the base is adapted to be positioned over the connector such that the connector is at least partially received in the cavity of the base, the push button engaging the toothed wheel,
   wherein a projection is provided on an inner surface of the base and extends into the cavity, the projection is resilient and dimensioned to be received between adjacent teeth of the toothed wheel, engagement of the projection with the toothed wheel allowing for angular adjustment of the cup with respect to the base.

2. The cup holder of claim 1, wherein the mounting member is an elongated strap for wrapping around the associated stroller bar, the strap having a hook-and-loop fastener and including a high coefficient of friction material for gripping the associated stroller bar, and the base including at least one slot that receives the strap.

3. The cup holder of claim 1, wherein the toothed wheel cooperates with the inner surface of the base to prevent the cup from swinging freely and allow for rotation of the cup about an axis of the toothed wheel to adjust a mounting angle of the cup with respect to the base.

4. The cup holder of claim 1, wherein the tightening mechanism includes a clamp movable in a translational manner relative to the base into engagement with the associated stroller bar.

5. The cup holder of claim 4, wherein the tightening mechanism includes a knob and a threaded rod connected to the clamp, rotational movement of the threaded rod via the knob resulting in the translational movement of the clamp.

6. The cup holder of claim 4, wherein the clamp is positioned opposite the mounting member, the clamp pressing the mounting member into engagement with the associated stroller bar.

7. A cup holder for an associated stroller comprising:
   a cup for releasably holding therein an associated drink container; and
   a base detachably connected to the cup; and
   a release mechanism including a push button operably provided on the base and a support member fixedly attached to a base member to define a one-piece unitary part, the support member including teeth provided about an outer periphery of the support member, the base member fixed in position on an outer surface of a sidewall of the cup, the push button including a catch engaging a face of the support member to releasably secure the base to the cup, wherein the teeth of the support member cooperate with an inner surface of the base to prevent the cup from swinging freely and allow for angular adjustment of the cup with respect to the base.

8. The cup holder of claim 7, wherein a sidewall of the cup includes inwardly extending flaps aligned in a plane that is nearer to parallel with a central axis of the cup as compared to perpendicular with the central axis.

9. The cup holder of claim 7, wherein a projection is provided on the inner surface, the projection dimensioned to be received between adjacent teeth of the support member.

10. The cup holder of claim 9, wherein the projection is resilient and at least partially received in a cutout located on the inner surface.

11. The cup holder of claim 7, further including an elongated strap for releasably connecting the cup holder to an associated stroller bar, the strap including a section having a high coefficient of friction for gripping the associated stroller bar, and a tightening mechanism for tightening the strap against the associated stroller bar.

12. The cup holder of claim 11, wherein the tightening mechanism includes a threaded rod connected to a clamp, rotational movement of the threaded rod resulting in translational movement of the clamp into engagement with the strap and associated stroller bar.

* * * * *